US006760630B2

(12) United States Patent
Turnaus et al.

(10) Patent No.: US 6,760,630 B2
(45) Date of Patent: Jul. 6, 2004

(54) METHOD AND IMPLEMENTATION OF PROCESS CONTROL

(75) Inventors: André Turnaus, Nuernberg-Moorenbrunn (DE); Bernhard Reichle, Schwanstetten (DE)

(73) Assignee: Siemens Aktiengesellschaft, Munich (DE)

( * ) Notice: Subject to any disclaimer, the term of this patent is extended or adjusted under 35 U.S.C. 154(b) by 481 days.

(21) Appl. No.: 09/824,950

(22) Filed: Apr. 3, 2001

(65) Prior Publication Data

US 2002/0143498 A1 Oct. 3, 2002

(51) Int. Cl.[7] ............................................. G05B 11/01
(52) U.S. Cl. ............................ 700/18; 700/17; 700/19; 700/26; 700/86; 717/100; 717/102; 717/119; 717/121
(58) Field of Search ........................... 700/2–5, 17, 18, 700/19–20, 26, 83–86; 717/100, 102, 119, 121, 134, 135

(56) References Cited

U.S. PATENT DOCUMENTS

| 5,813,993 A | * | 9/1998 | Kaplan et al. .............. 600/544 |
| 6,006,022 A | * | 12/1999 | Rhim et al. .................... 716/1 |
| 6,367,056 B1 | * | 4/2002 | Lee ............................... 716/5 |

* cited by examiner

Primary Examiner—Ramesh Patel
(74) Attorney, Agent, or Firm—Baker Botts L.L.P.

(57) ABSTRACT

A software-implemented method and implementation is disclosed for commissioning an automated system. The implementation analyzes the configuration of one or more operational components in the automated system and generates one or more operator communication and monitoring masks for each of the operational components. An interface is provided with the at least one mask to parametize the at least one operational component.

30 Claims, 2 Drawing Sheets

METHOD AND IMPLEMENTATION OF PROCESS CONTROL

BACKGROUND OF THE INVENTION

The present invention is directed to the field of process control for an automated system, e.g. an industrial process system. The commissioning of a system or an automation system is usually associated with significant expense. Complex operating sequences must be accomplished in this phase in order to produce a correctly working system at the end of the commissioning phase.

Under the automation aspect, a system can be logically divided into two main areas: the control unit server (or other computer unit with the software executed thereon in order to control the process) and the process peripherals (i.e. operational components including actuators and sensors.) The process peripherals are represented in the control unit such that process values are read into the server and processed by the program being executed thereon, which calculates new adjusting values that are subsequently fed back into the process. Complex functions for representing input values and output values are executed on the server to direct the operational components. Depending on the respective application, the operational components can include components for monitoring filling levels or diverse controller components. In order to ensure that these operational components are able to fulfill their purpose in a specialized technical environment, they must be adapted to the process, that is, correspondingly parametized. For example, suitable specific values such as limiting values must be defined as parameters for controller components.

The above-described basic system requires that the commissioning of a system also includes the commissioning of the server and that the process peripherals must be connected. In the commissioning of the server, the configured software program must be executed on the server. It should be considered that the syntactical correctness of the program had already been checked during the engineering phase. Commissioning pertains to an examination of whether the program behaves logically and as intended when implemented, e.g., whether the cooling unit is activated once a limiting temperature is exceeded. This test can result in problems in that often no test system is available at an earlier point of the installation phase, i.e. the program must be tested without process peripherals. This results in the necessity to simulate the interface with the process in a suitable fashion.

As mentioned above, the important aspect in connecting the process peripherals consists of parametizing technological components carrying out fine-tuning. Conventional engineering systems for configuring systems provide possibilities for testing server programs and parametizing controllers. However, the disadvantage is that the installation for the engineering process are typically employed for this purpose. These tools provide an extensive series of mechanisms and a detailed overview of all configuring data of an entire system. However, only a small partial quantity of this information is required for the commissioning. Only certain installation functions, such as testing, parametizing, simulating of the process peripherals only certain installation), etc. operate in accordance with selected data, such as controller values, sensor values, simulation signals, etc. Consequently, the tools for commissioning a new system are unnecessarily complicated and difficult to use, resulting in an excessive amount of time and effort (and thus expense) in commissioning a new system.

In installation and commissioning of a previous-type system, it has been known to create custom interface masks that can be deployed on an operator station of the process control system. Such operator stations are used to deploy the operating and monitoring systems for controlling an automated processes, and such operating and monitoring systems typically employ a user-friendly graphical interface, or "screen mask." However, screen masks for installation and commissioning must be manually configured with resulting high expense. Such expense is frequently not justifiable due to their short "service life." Consequently, it is common to forego mask development and simply rely on rudimentary functions available from the engineering tools.

SUMMARY OF THE INVENTION

In view of the difficulties and drawbacks associated with previous-type systems, there is therefore a need for a method and implementation for commissioning that is simple and easy to use.

There is also a need for a method and implementation of commissioning that integrates specific functions and data into a uniform and user-friendly top level interface.

These needs and others are satisfied by the method and implementation of the present invention in which a software-implemented method and implementation is provided for commissioning an automated system. The implementation analyzes the configuration of one or more operational components in the automated system and generates one or more operator communication and monitoring masks for each of the operational components. An interface is provided with the at least one mask to parametize the at least one operational component.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

The present invention includes a software component that forms part of a process control system and generates visual masks from the configuring data of the automation system in an operator station, wherein functions for commissioning a system are integrated in the visual masks. This software can be used generically with any system and makes it possible to use an operator station for the commissioning of a system without creating additional configuration expense. Commissioning functions pertain to functions for testing the automation system and the program executed thereon, for simulating the interface with the process and for parametizing operational technological components (e.g., controller components).

The software component automatically generates generic software masks for the operator station. Various functions are integrated into these generated masks, including commissioning functions for parametizing the operational components, functions for testing the automation system and/or the executed program, and functions for simulating the interface with process peripherals. The software analyzes the configuration of the operational components and generates masks tailored to the configuring data, such as the operational structure of the system and the types of operational components used by the system.

Figure 1:
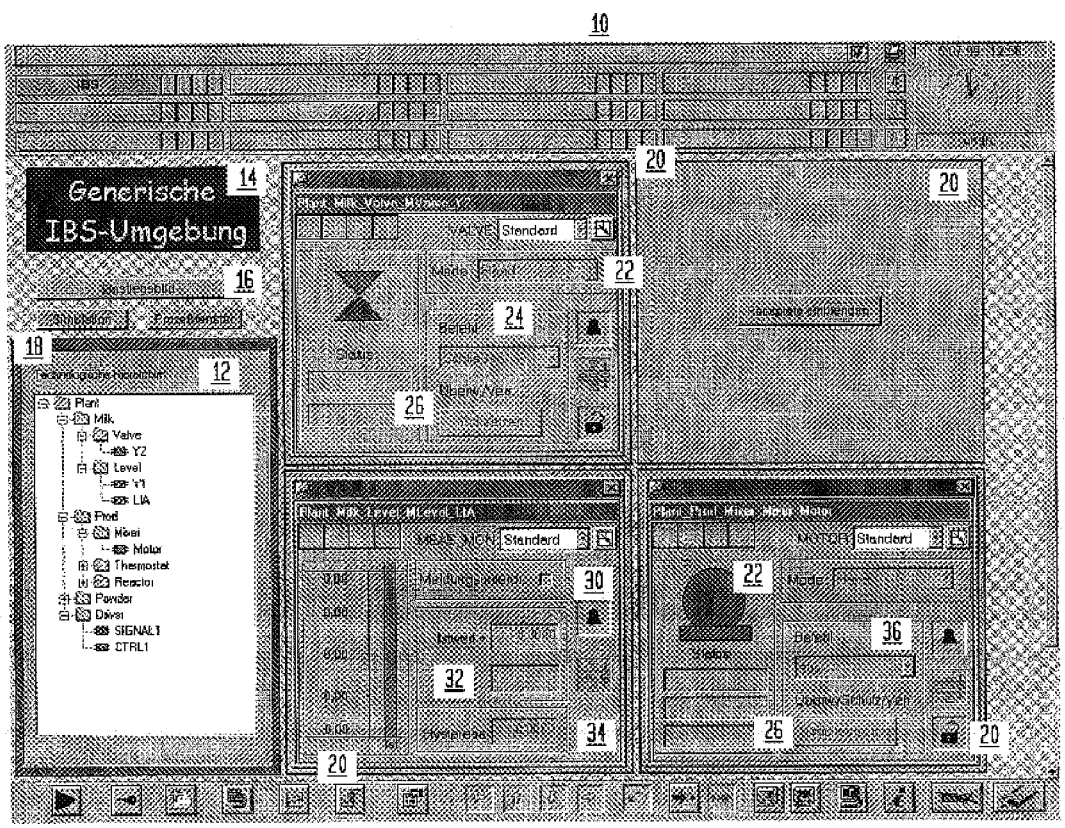
FIG. 1 shows a screen mask for a generic installation and commissioning interface, in accordance with the present invention.

FIG. 1 shows a graphical interface mask 10 generated by the software component. In the preferred embodiment, the present software component operates in conjunction with Process Control System PCS7 produced by Siemens AG. The present software component analyzes the applied configuring data of each operational component of the process control system, and then generates corresponding masks 10 for operation and monitoring. In the preferred embodiment, these masks 10 are generated as part of the WinCC visualization and control software produced by Siemens AG. An operator interfaces with these masks 10 to parametize the operational components of the system. It should be understood that, in a Windows operating system, the present masks can be displayed as Windows, or other-type interfaces in another operating system environment, such as Linux, Unix or Macintosh.

The commissioning functions are integrated into the WinCC masks generated by the software component. The exemplary mask 10 of FIG. 1 includes a system image 12 that shows the functional hierarchy of the operational components in the automated system. In a directory tree format, the system image 12 shows the operational components as configured in the system and provides access to these components. The mast 10 also includes a title identifier 14, an access identifier 16 and a process identifier 18 for indicating information regarding the system, application and process currently being configured.

The system image 12 can be used to generate a separate operator communication and monitoring mask for any of the operational components indicated thereon. Alternatively, a visual submask 20 or "faceplate" can be generated and displayed within the mask 10. These submasks 20 can dynamically display information of the current operational state of the respective component in run-time mode. The information displayed on the submask 20 is adapted to the configuration of the parameters of the component. Various input fields are included to allow interfacing and parametizing of the component, in order to set threshold limits for desired operation. A corresponding allocation is effected dynamically.

The input fields can be drop-down menus for varying specific command states, or can allow direct keyboard entry for changing specific numerical values. As shown in FIG. 1, a valve control submask can include a first field 22 that can vary the mode between manual and automatic. A second field 24 can issue commands e.g. to close or open a valve. A third field 26 can reset a monitor/lock operational state to a default value. In a level indicator submask, a first field 30 can be used to enable message suppression. A second field 32 can display or define an actual or target value of fill level, and a third field 34 measure hysteresis in the component. A mixer motor submask can include a first field 22 for selecting between manual and automatic operation. A second field 36 can be used to select between on and off commands, and a third field 26 can reset a monitor/protect/lock operational state to a default value. By means of the above-referenced input fields, the operational parameters of the respective component can be adjusted on-line. Of course, it is understood that the above is given as an exemplary embodiment, and any mask or submask can be tailored to access operational parameter of any component, without departing from the invention.

Figure 2:
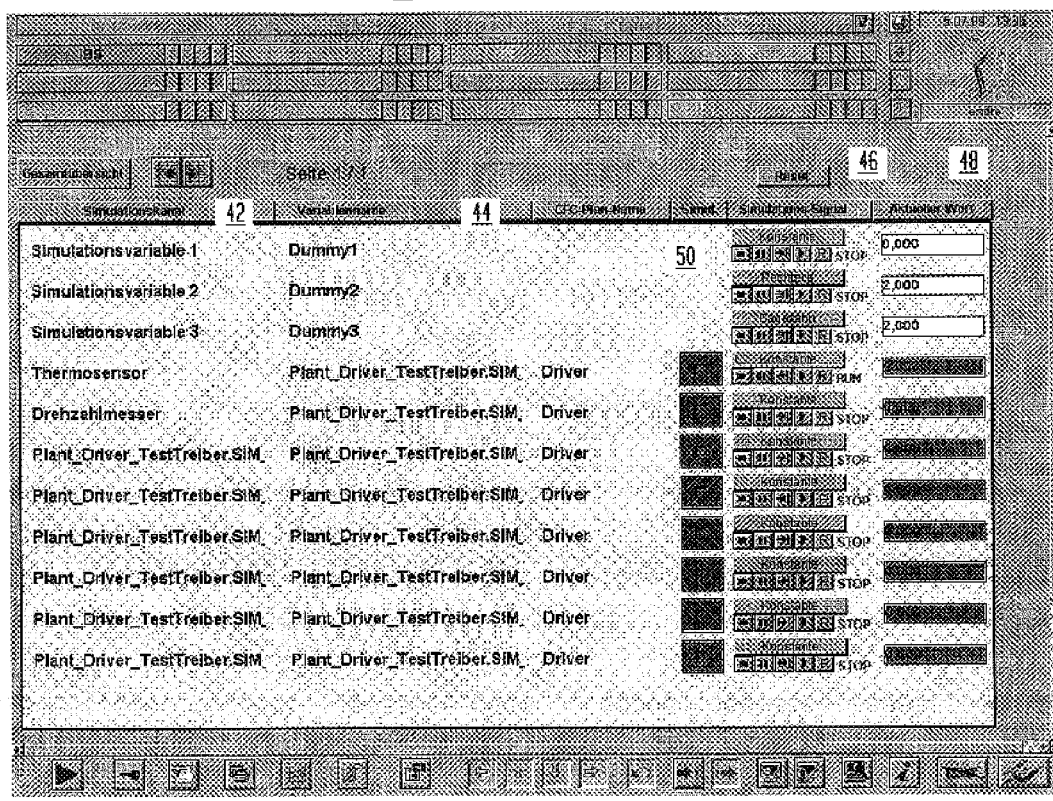
FIG. 2 shows a screen mask for a simulation interface, in accordance with another aspect of the invention.

FIG. 2 shows a mask 40 for adjusting a simulation interface. The software component allows the selection of a plurality of internal and external process variables, in order to carry out a simulation. Sensors and plant drivers can also be selected as variables. Each selected variable is represented in the mask 40 as a simulation channel 42, which is also assigned a variable name 44. Each simulation channel 42 has a corresponding simulation signal 46 that can be parametized by inputting a desired numerical value into an actual value field 48. A switching surface 50 is provided for controlling the function of each channel, e.g. "STOP," "RUN," and "PAUSE." Also, the "RUN" operational state can be selected as either a constant function, or a rectangle or saw tooth function, using the switching surface.

In addition, the software component can implement a mathematical algorithm (preferably mathematics software such as "Matlab") in order to solve complex simulation problems and consider the mutual dependencies between simulation channels. Also, the selected and parametized simulation channels can be saved and stored in a "simulation scenario" and reused at a later time.

The present simulation masks 40 can parametize all the various simulation variables, and consequently it is possible to test the program prior to establishing a process connection. The present invention also provides an early test of the automation system during system configuration, resulting in early detection of errors and reduced cost. By combining installation and commissioning functions into a user-friendly graphic interface, minimal engineering expertise is required for commissioning. Also, rational commissioning operation is permitted since functions are distributed over several masks and unnecessary details are hidden, resulting in fewer errors by personnel.

As described hereinabove, the present invention solves many problems associated with previous type methods and systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A software-implemented method of commissioning an automated system comprising the steps of:

analyzing the configuration of at least one operational component in the automated system;

generating at least one operator communication and monitoring mask for each of the at least one operational component; and interfacing with the at least one mask to parametize the at least one operational component.

2. The method of claim 1 wherein the automated system is an industrial process control system.

3. The method of claim 1 wherein, after the step of analyzing, generating at least one system image that shows a functional hierarchy of the operational components in the automated system.

4. The method of claim 3 further comprising the step of selecting at least one operator communication and monitoring mask using the at least one system image.

5. The method of claim 1 wherein the step of generating at least one operator communication and monitoring mask further comprises generating at least one submask for dynamically displaying the operational state of the at least one operational component.

6. The method of claim 5 wherein the step of interfacing comprises adjusting parameters using at least one input field in the at least one submask.

7. The method of claim 1 wherein the step of interfacing comprises selecting a plurality of internal and external process variables in order to carry out a simulation, wherein each selected variable forms on simulation channel.

8. The method of claim 7 wherein the step of interfacing further comprises parametizing at least one simulation signal for each simulation channel.

9. The method of claim 7 further comprising the step of implementing a mathematical algorithm for solving simulation problems and considering mutual dependencies between simulation channels.

10. The method of claim 1 further comprising the step of saving the selected and parametized simulation channels in a simulation scenario.

11. A computer usable medium having computer readable program code embodied therein for commissioning an automated system, the computer readable program code in a computer program product comprising:

instructions for analyzing the configuration of at least one operational component in the automated system;

instructions for generating at least one operator communication and monitoring mask for each of the at least one operational component; and instructions for interfacing with the at least one mask to parametize the at least one operational component.

12. The computer program product of claim 11 wherein the automated system is an industrial process control system.

13. The computer program product of claim 11 wherein, after the instructions for analyzing, instructions for generating at least one system image that shows a functional hierarchy of the operational components in the automated system.

14. The computer program product of claim 13 further comprising instructions for selecting at least one operator communication and monitoring mask using the at least one system image.

15. The computer program product of claim 11 wherein the instructions for generating at least one operator communication and monitoring mask further comprises instructions for generating at least one submask for dynamically displaying the operational state of the at least one operational component.

16. The computer program product claim 15 wherein the instructions for interfacing comprises instructions for adjusting parameters using at least one input field in the at least one submask.

17. The computer program product claim 11 wherein the instructions for interfacing comprises instructions for selecting a plurality of internal and external process variables in order to carry out a simulation, wherein each selected variable forms on simulation channel.

18. The computer program product claim 17 wherein the instructions for interfacing further comprises instructions for parametizing at least one simulation signal for each simulation channel.

19. The computer program product of claim 17 further comprising instructions for implementing a mathematical algorithm for solving simulation problems and considering mutual dependencies between simulation channels.

20. The computer program product of claim 11 further comprising instructions for saving the selected and parametized simulation channels in a simulation scenario.

21. A computer software interface comprising:

means for analyzing the configuration of at least one operational component of an automated system;

at least one operator communication and monitoring mask for each of the at least one operational component; and means for parametizing the at least one operational component, for within the at least one mask.

22. The computer interface of claim 21 wherein the automated system in an individual process control system.

23. The computer software interface of claim 21 wherein the operator communication and monitoring mask further comprises at least one system image for showing the functional hierarchy of the operational components in the automated system.

24. The computer software interface of claim 23 further comprising means for selecting at least one operator communication and monitoring mask from the at least one system image.

25. The computer software interface of claim 21 further comprising at least one submask, displayed within the operator communication and monitoring mask, for dynamically displaying the operational state of the at least one operational component.

26. The computer software interface of claim 25 wherein the at least one submask comprises the at least one input field for adjusting parameters.

27. The computer software interface of claim 21 further comprising a plurality of simulation channels, corresponding to a plurality of selected internal and external process variables, in order to carry out a simulation.

28. The computer software interface of claim 27 further comprising at least one simulation signal, parametized for each simulation channel.

29. The computer software interface of claim 27 further comprising a mathematical algorithm for solving simulation problems and considering mutual dependencies between simulation channels.

30. The computer software interface of claim 27 further comprising means for saving the selected and parametized simulation channels in a simulation scenario.

* * * * *